United States Patent [19]
Srivastava et al.

[11] Patent Number: 6,049,417
[45] Date of Patent: Apr. 11, 2000

[54] WIDE BAND OPTICAL AMPLIFIER

[75] Inventors: Atul Kumar Srivastava, Eatontown; James William Sulhoff, Ocean; Yan Sun, Middletown; John Lehrer Zyskind, Shrewsbury, all of N.J.

[73] Assignee: Lucent Technologies Inc., Murray Hill, N.J.

[21] Appl. No.: 09/079,938

[22] Filed: May 15, 1998

Related U.S. Application Data

[60] Provisional application No. 60/047,375, Jun. 2, 1997.

[51] Int. Cl.[7] .................................................. H01S 3/00
[52] U.S. Cl. .......................................... 359/341; 359/349
[58] Field of Search ...................... 359/341, 349

[56] References Cited

U.S. PATENT DOCUMENTS

| | | | |
|---|---|---|---|
| 5,392,154 | 2/1995 | Chang et al. | 359/341 |
| 5,452,116 | 9/1995 | Kirkby et al. | 359/124 |
| 5,801,858 | 9/1998 | Roberts et al. | 359/114 |

OTHER PUBLICATIONS

I. Yamashita et al, "ER[3] Doped Fibre Amplifier With Subsidiary EDF For Application In WDM Systems Using Two Separate Wavelength Bands of 1.53 and 1.55 μm", Electronics Letters, vol. 32, No. 8, Aug. 29, 1996, pp. 1690–1691.

J. F. Massicott et al, "Low Noise Operation of $Er^{3+}$ Doped Silica Fibre Amplifer Around 1.6 μm", Electronics Letters, vol. 28, No. 20, Sep. 24, 1992, pp. 1924–1925.

P.F. Wysocki et al, "Erbium–Doped Fiber Amplifer Flattened Beyond 40 nm Using Long–Period Grating", Conference On Optical Fiber Communications, Technical Digest, Postconference Edition, 1997 OSA Technical Digest Series, vol., 6, Dallas, TX, USA, 16–21, pp. 375–378.

A. K. Srivastava et al, "32×10 Gb/s WDM Transmission Over 640 km Using Broadband, Gain–Flattened Erbium–Doped Silica Fiber Amplifiers", Conference on Optical Fiber Communications, Technical Digest, Postconference Edition, 1997 OSA Technical Digest Series, vol. 6, Dallas, TX, USA, 16–21, pp. 439–442, 1997.

Y. Sun et al, "An 80 nm Ultra Wide Band EDFA With Low Noise Figure And High Output Power", 11th International Conference On Integrated Optics and Optical Fibre Communications 23rd European Conference On Optical Communications, IOOC–ECE97, Post Deadline Papers, vol. 5., pp. 69–72, 1997.

*Primary Examiner*—Mark Hellner
*Attorney, Agent, or Firm*—J. J. Brosemer

[57] ABSTRACT

A wide band optical amplifier employing a split-band architecture in which an optical signal is split into several independent sub-bands which then pass in parallel through separate branches of the optical amplifier. Each branch may be optimized for the sub-band that traverses it. The independent sub-bands are combined before output, resulting in a broad band, high efficiency amplifier. Alternative, hybrid split-band amplifiers are described. As a result of their desirable characteristics, these wide band optical amplifiers may be used in dense WDM communications systems.

17 Claims, 6 Drawing Sheets

200

400

600

WIDE BAND OPTICAL AMPLIFIER

CROSS REFERENCE TO RELATED APPLICATIONS

This application claims the benefit of U.S. Provisional Application No. 60/047,375 filed Jun. 2, 1997.

FIELD OF THE INVENTION

The present invention relates generally to the field of optical communications and in particular to a wide band optical amplifier.

BACKGROUND OF THE INVENTION

There has been considerable interest in using rare earth-doped optical fiber amplifiers to amplify optical signals used in communications systems and networks. These rare earth-doped optical fiber amplifiers are found to be cost effective, exhibit low-noise, provide relatively large bandwidth which is not polarization dependent, display substantially reduced crosstalk, and present low insertion losses at relevant operating wavelengths. As a result of their favorable characteristics, rare earth-doped optical fiber amplifiers, e.g., erbium-doped fiber amplifiers (EDFAs), are replacing current optoelectronic regenerators in many optical lightwave communications systems and in particular, wavelength-division-multiplexed (WDM) optical communications systems and networks.

In an attempt to increase the capacity of these WDM optical communications systems and networks, it has been shown that it is generally desirable to have as many wavelength-division multiplexed (WDM) optical channels as possible within a given WDM system. As can be appreciated, broad band optical amplifiers are required to implement these "dense" WDM (DWDM) optical systems and networks.

With reference now to FIG. 1, there it is shown that the total possible gain spectrum for EDFAs is very wide. Unfortunately, however, the usable gain bandwidth for EDFAs is only about 10 nm, thereby limiting their utility for DWDM systems.

Of course, those skilled in the art will know that this gain bandwidth for EDFAs can be extended by approximately 40 nm, from around 1525 nm to 1565 nm through the use of Gain Equalization Filters (GEFs). See, e.g., A. K. Srivistava, J. B. Judkins. Y. Sun. L. Garrett, J. L. Zyskind, J. W. Sulhoff, C. Wolf, R. M. Derosier, A. H. Gnauck, R. W. Tkach, J. Zhou, R. P. Espindola, A. M. Vengsarkar, and A. R. Chraplyvy, "32×10 Gb/s WDM Transmission Over 640 km Using Broad Band, Gain-Flattened Erbium-Doped Silica Fiber Amplifiers," *Proc. OFC*, Dallas, Tex., pp. PD18, Feb. 16–21, 1997; Y. Sun. J. B. Judkins, A. K. Srivastava, L. Garrett, J. L. Zyskind, J. W. Sulhoff, C. Wolf, R. M. Derosier, A. H. Gnauck, R. W. Tkach, J. Zhou, R. P. Espindola, A. M. Vengsarkar, and A. R. Chraplyvy, "Transmission of 32 WDM 10 Gb/s Channels Using Broad Band, Gain-Flattened Erbium-Doped Silica Fiber Amplifiers," *IEEE Photon Tech. Lett.*, 1997; and P. F. Wysocky, J. B. Judkins, R. P. Espindola, M. Andrejco, A. M. Vengsarkar, and K. Walker, "Erbium Doped fiber Amplifier Flattened Beyond 40 nm Using Long-Period Grating," *Proc. OFC*, Dallas, Tex., pp. PD2, Feb. 16–21, 1997. With further reference to FIG. 1, it can be seen that the gain for an EDFA drops sharply in the regions below 1525 nm and the regions above 1565 nm. Consequently it is impractical to further increase the gain bandwidth of EDFAs with GEFs since such an approach would require an unacceptably large amount of pump power and a correspondingly large number of GEFs to maintain an acceptably low noise figure.

Previous work has shown that significant optical gain can be obtained in the wavelength range between 1.57 and 1.60 $\mu$m. See, for example, J. F. Massicott, J. R. Armitage, R. Wyatt, B. J. Ainslie, and S. P. Craig-Ryan, "High Gain, Broadband 1.6 $\mu$m $Er^{3+}$ Doped Silica Fibre Amplifier," *Elec. Lett.*, Vol. 26, No. 14. pp. 1038–1039, September, 1990; J. F. Massicott, R. Wyatt, and B. J. Ainslie, "Low Noise Operation of $Er^{3+}$ Doped Silica Fibre Amplifier Around 1.6 $\mu$m," *Elec. Lett.*, Vol. 26, No. 20, pp. 1645–1646, September, 1990. Additionally, new doping materials have been used to enhance erbium-doped fibers in the wavelength range between 1.53 and 1.56 $\mu$m. In particular, Flouride EDF has been shown to provide additional gain and reports have indicated that Tellurite EDF shows great promise. See, e.g., A. Mori, Y. Ohishi, M. Yamada, H. Ono, Y. Nishida, K. Oikawa and S. Sudo, "1.5 $\mu$m Broadband Amplification by Tellurite-Based EDFA's,", *Proc. OFC*, pp. PD1, Dallas, Tex., Feb. 16–21, 1997. Despite such promise however, the gain spectrum of such EDF is typically non-uniform and other important properties such as mechanical stability are poorly understood.

It is evident from this background then that alternative approaches to developing wide band optical amplifiers are required.

SUMMARY OF THE INVENTION

We have discovered a wide band optical amplifier that comprises a split-band architecture. The wide band amplifier includes at least two sections, a first common section and a second, split section. In operation, optical signals enter the common section are then split into two (or more) independent sub-bands. Each of these independent sub-bands is directed into separate branches of the second, split section in which they are optionally amplified before being subsequently re-combined into an output signal.

In accordance with the present invention, each of the separate branches of the split section may be optimized for the sub-band that traverses it. Additionally, one or more of the separate branches may be further split, permitting hybrid structures exhibiting alternative characteristics.

Further features and advantages of the present invention, as well as the structure and operation of various embodiments of the present invention are described in detail below with reference to the accompanying drawing.

DETAILED DESCRIPTION OF THE INVENTION

Figure 1:
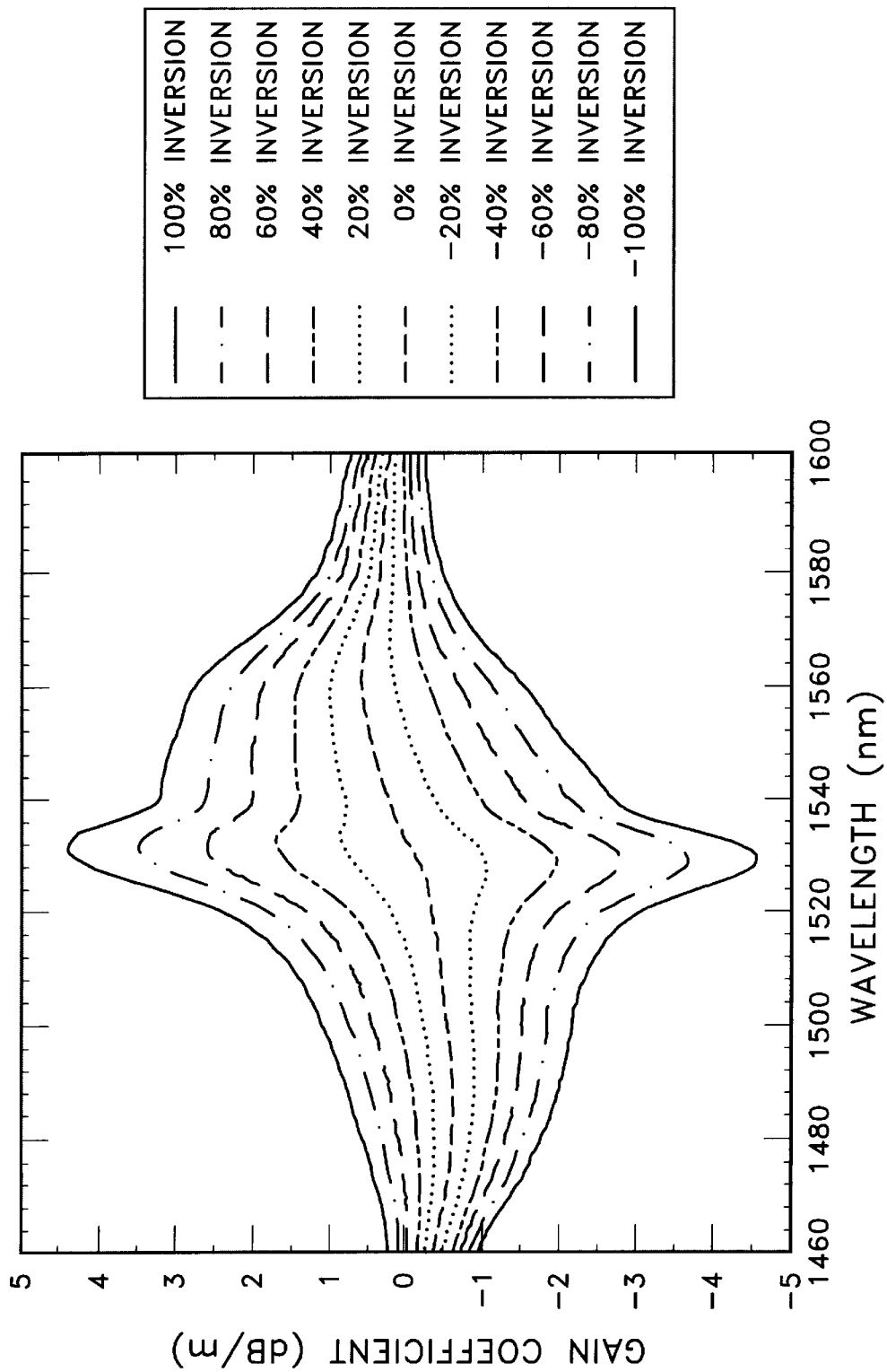
FIG. 1 is a plot of gain coefficient (dB/m) vs. wavelength (nm) for an erbium-doped silica fiber at different inversion levels.
Figure 2:
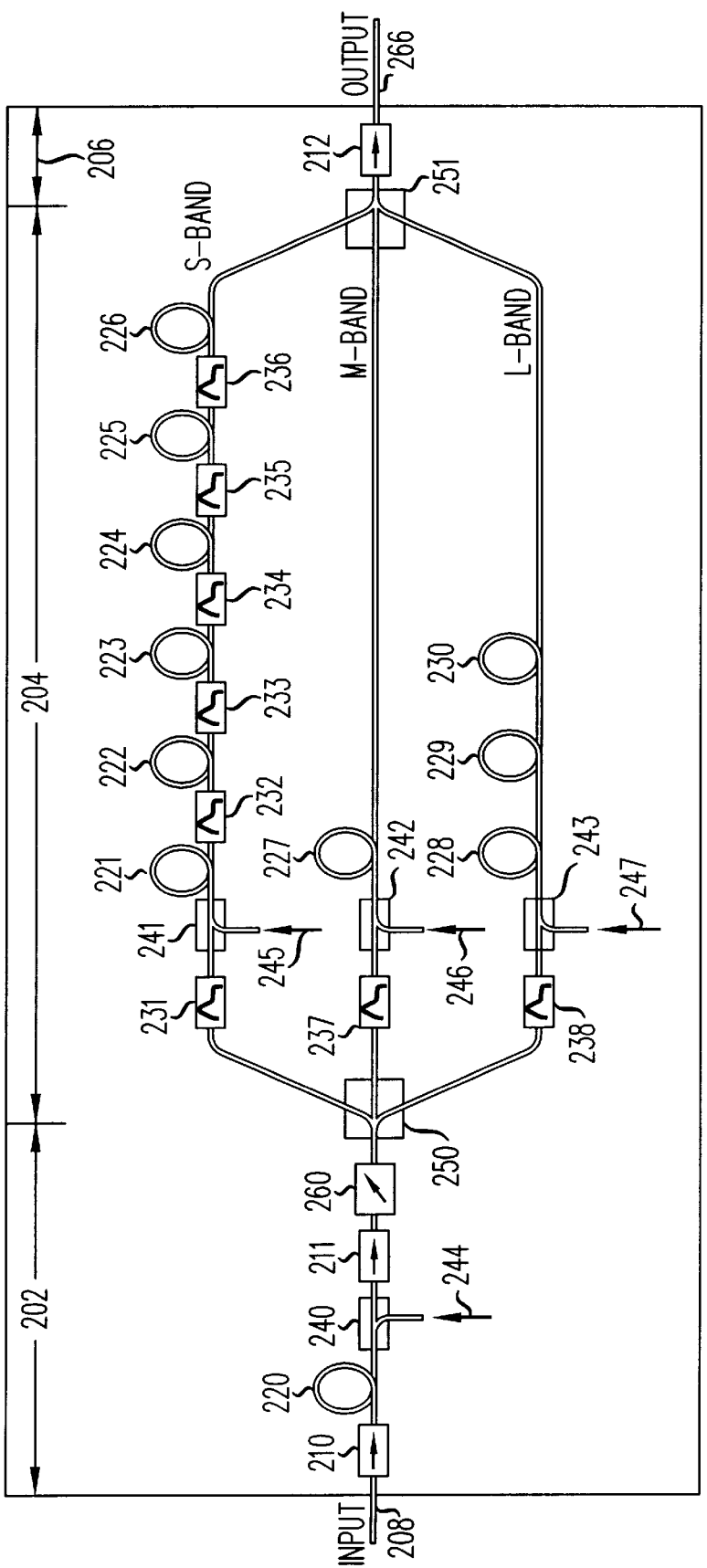
FIG. 2 is a schematic view of a wide band fiber amplifier according to the invention.

FIG. 2 illustrates the basic principle of our wide band, optical fiber amplifier. The wide band amplifier shown there 200, is divided primarily into two sections, namely, a first common section 202, and a second, split section 204. Briefly stated, optical signals enter the common section 202 of the wide band optical amplifier 200. The signals are then split into two (or more) independent bands and each of these independent bands is then directed into separate branches of the second, split section 204. In parallel, the independent bands may be amplified within these separate branches and then subsequently recombined into an output signal. Optionally, the re-combined output signal may be further amplified or otherwise processed in output section 206.

Based upon this principle, a wide-band optical amplifier may be implemented. With continued reference to FIG. 2, optical signals enter the wide band optical amplifier 200 through input port 208 and exit from output port 266, with the output port 266 being "downstream" of the input port 208. Components 210–212 are optical isolators 220–230 are erbium-doped amplifier fibers, 240–243 are wavelength-selective optical fiber couplers or "WDMs" for coupling pump radiation 244–247 into the amplifier fibers, 231–238 are GEFs, 260 is an attenuator, and 250–251 are a demultiplexer and a multiplexer, respectively. Optical isolators, attenuators, GEFs, WDMs, multiplexers, and demultiplexers are generally known, some of which are commercially available. Those skilled in the art know that it is conventional, but optional, to place optical isolators respectively upstream and downstream of an EDFA.

As can be seen from FIG. 2, all entering optical signals pass through the common section 202 where they may be amplified prior to splitting. In this exemplary structure, the signals are split into three sub-bands through the action of the demultiplexer 250. More specifically, the signals are split into a short wavelength band (S-band), a middle wavelength band (M-band—also known as the conventional or C-band) and a long wavelength band (L-band), each corresponding to a branch of the split section 204. As should now be apparent, this splitting of the optical signals into multiple bands permits the separate, parallel amplification of the bands.

Those skilled in the art will of course recognize that the sub-bands into which the optical signals are split are not fixed but are variable, and may be described by a range of wavelengths. As used in this example however, the S-band ranges from 1510 nm to 1525 nm, the M-band ranges from 1525 nm to 1565 nm, and the L-band ranges from 1565 nm to 1610 nm. Of course, these ranges will vary depending upon the particular EDF, the design and application.

Generally, the common section 202 is strongly inverted in order to achieve a low noise figure. Additionally, the inversion level of the EDF in the S-band may be kept high to achieve a high gain and high output power in this sub-band. Since this may also produce a strong gain variation among signal channels, multiple GEFs may be employed along the EDF to achieve a substantially flat gain and a low noise figure at the same time.

Likewise, the remaining sub-bands shown in our exemplary structure present additional design considerations. In particular, the M-band may be designed to produce a high power, flat gain and low noise figure through the use of GEFs and one or more stages. For the L-band, the inversion level must be maintained at a low level and a GEF may preferably be used to improve gain flatness. Similarly, more than one stage may be employed to enhance the output power for this sub-band.

Multiplexing (Mux) and demultiplexing (de-Mux) of optical signals depicted by reference numerals 250 and 251 in FIG. 2 respectively, may be accomplished in a variety of ways, such as through the use of thin film filters, waveguide routers, and fiber gratings together with circulators. As can be appreciated, the width of guiding bands between two adjacent sub-bands is largely determined by the sharpness of Mux and de-Mux technology used and the precision or accuracy of the GEF.

A numerical simulation was performed using the wide band optical amplifier structure of FIG. 2 in which the total optical spectrum is divided into three sub-bands. For the simulation, six GEFs 231–236 were used in the S-band. All of the pump lasers 245–247 were operated at 980 nm with a pump power of 26 dBm in the S-band, and a 20.8 dBm pump power for the M-band and L-bands. The high pump power in the S-band is generally required to produce a high inversion in the EDF.

Figure 3:
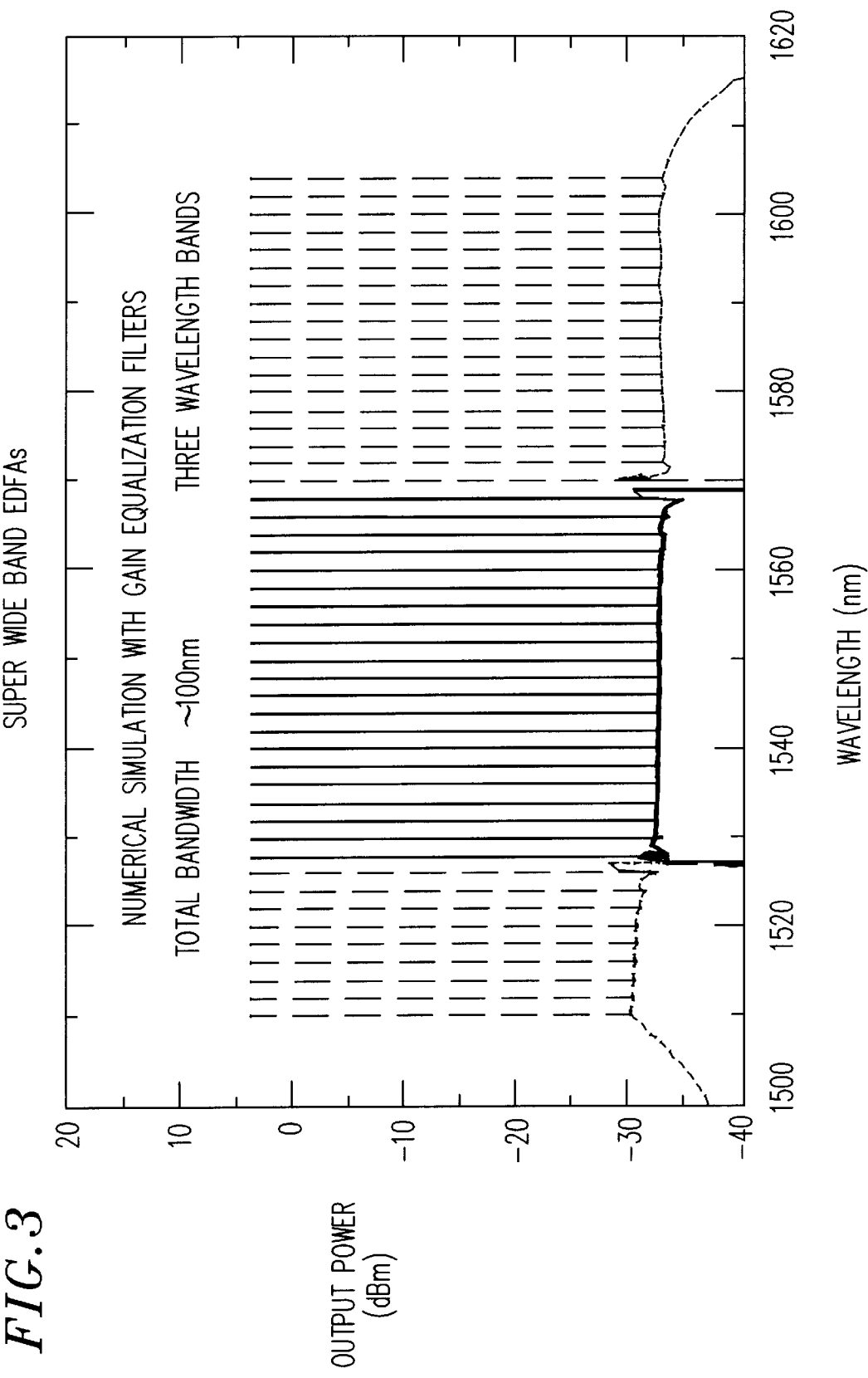
FIG. 3 is plot of output power (dBm) vs. wavelength (nm) resulting from a numerical simulation of a three sub-band, split-band fiber amplifier according to the invention.

The output power spectrum for the exemplary structure of FIG. 2, resulting from the simulation, is shown in FIG. 3. From this Figure, it can be seen that high output power is a characteristic of amplifiers constructed according to our teachings.

Figure 4:
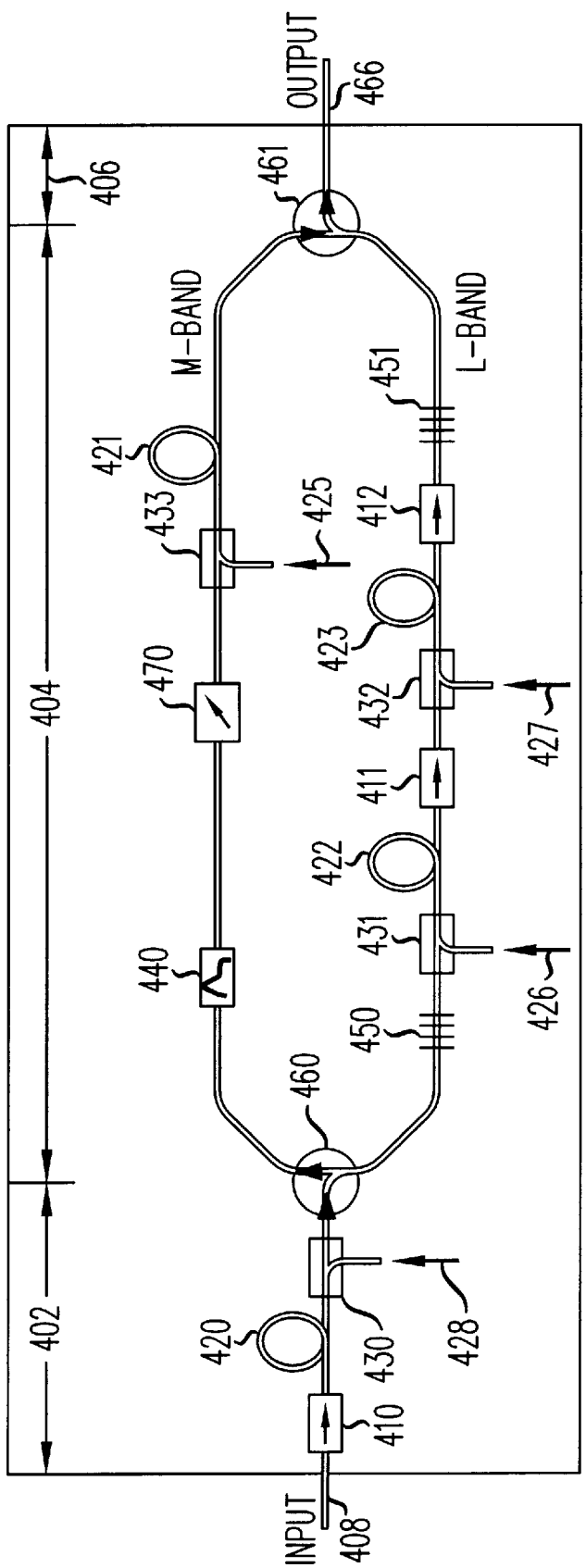
FIG. 4 is a schematic view of an experimental setup for a split-band fiber amplifier according to the invention having two sub-bands.

An alternative, wide band amplifier structure further illustrating the principles of the invention is shown schematically in FIG. 4. The structure illustrated therein includes a common section 402, and a split section 404 having two branches. Circulators 460–461 and wide band Bragg fiber gratings 450–451 are used to perform the de-Mux and Mux before and after the split section 404. With this exemplary wide band amplifier structure, one-stage amplification is employed for the M-band and two-stage amplification is performed for the L-band. All pumps are operated at 980 nm.

Figure 5:
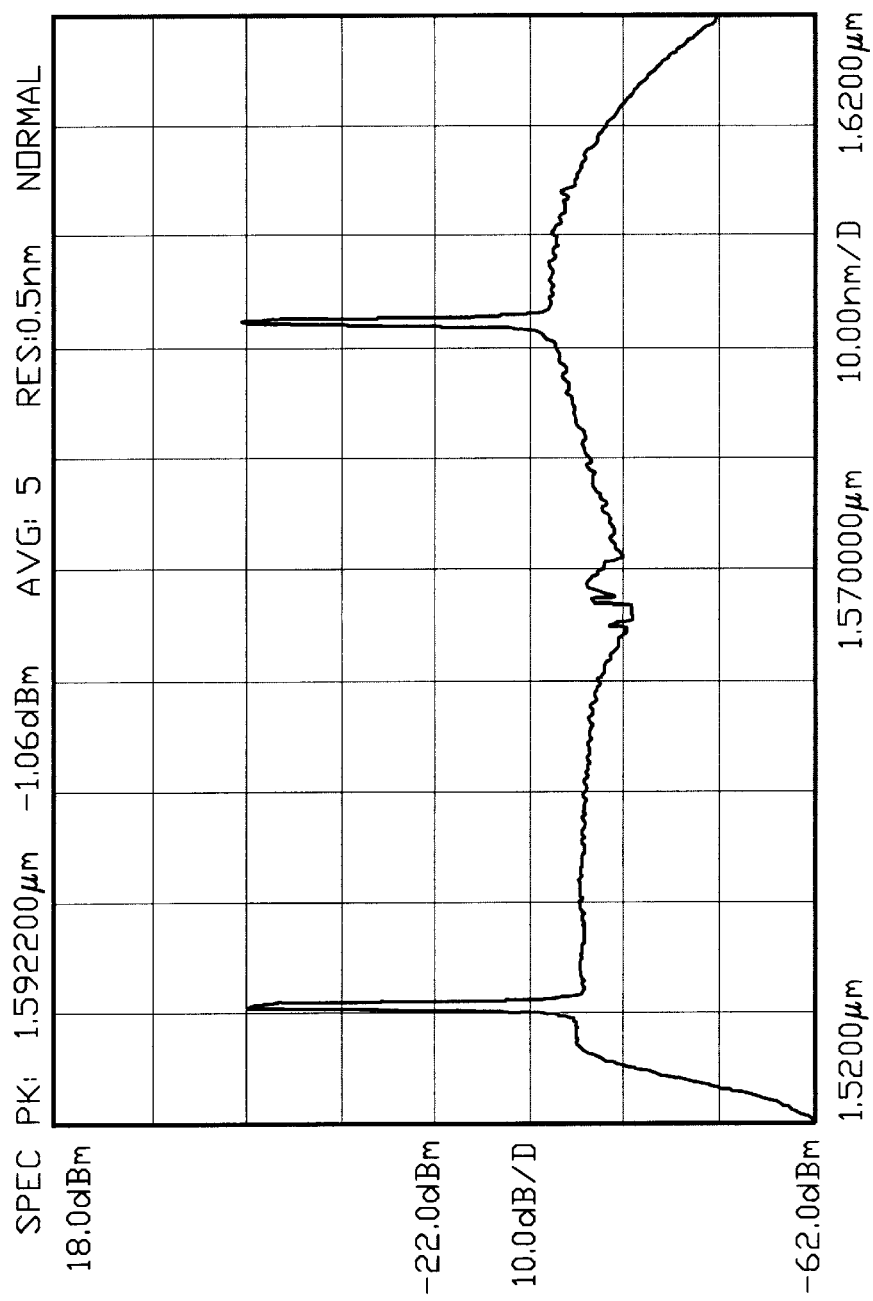
FIG. 5 is plot of the measured output spectrum for the fiber amplifier of FIG. 4.

Two signals, one at 1530 nm in the M-band and one at 1592 nm in the L-band were used as saturating sources. The total input power was −4.7 dBm and the total output power was 18.3 dBm, resulting in a gain of 23 dB. The output spectrum for the wide band amplifier structure is shown in FIG. 5.

From the foregoing, those skilled in the art should readily recognize that a number of variations to our split-band architecture are possible. In particular, there can be two, three or more sub-bands split from an input optical signal, depending upon the gain and loss spectrum of the EDF utilized. And while we have only used two sections of exemplary structures to illustrate our invention, more than two sections and even hybrid structures are contemplated and well within the principles of our invention.

Figure 6:
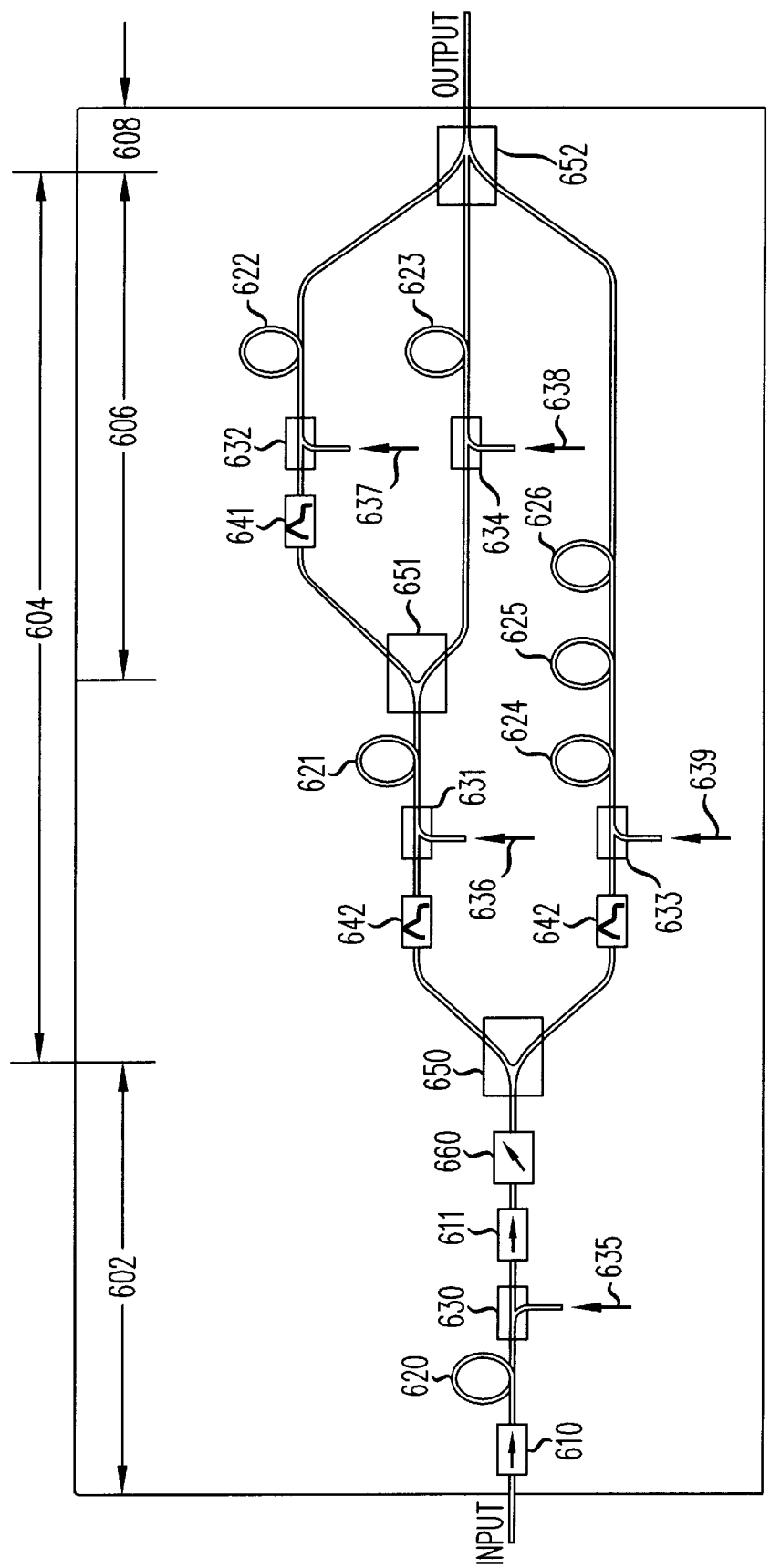
FIG. 6 is a schematic view of a hybrid, split-band optical amplifier according to the invention.

Such a hybrid, wide band amplifier structure is shown in FIG. 6. As with the previously described structures, the hybrid, wide band amplifier 600 shown schematically in FIG. 6 is divided primarily into two sections—a first common section 602, and a second, split section 604 having a number of separate branches through which independent, split sub-bands of optical signals traverse. What further characterizes this hybrid wide band amplifier architecture is that the split section 604 includes a further split or hybrid section 606, in which one (or more) of the separate branches are further split into additional separate branches.

Optical signals enter the common section 602 of the wide band optical amplifier 600 where they split into two independent sub-bands by de-Mux 650. Each of the independent sub-bands is then directed into separate branches of the second, split section 604. The signals traversing the upper branch of split section 604 are further split by de-Mux 651 into additional independent sub-bands. In parallel, all of the independent sub-bands may be amplified as desired within these separate branches and are subsequently re-combined into an output signal by Mux 652.

Various additional modifications of this invention will occur to those skilled in the art. In particular, some or all of the optical signals may be recycled. For example, any power rejected from one or more of the sub-bands may be used to pump another sub-band. Also, those skilled in the art will realize that further hybrid structures are possible. Specifically, one or more of the sub-bands may be amplified by a semiconductor amplifier instead of an EDF amplifier as discussed. Nevertheless, all deviations from the specific teachings of this specification that basically rely upon the principles and their equivalents through which the art has been advanced are properly considered within the scope of the invention as described and claimed.

What is claimed is:

1. An optical amplifier comprising:

an input section and a split section wherein optical signals that enter the section are split into a number of sub-bands; and a hybrid section in which at least one of the sub-bands that is directed into a separate branch of the split section is further split into a number of additional sub-bands that are then directed into further branches of the separate branch of the split section such that particular sub-bands may be amplified in parallel before being subsequently combined into the output signal.

2. The wide band optical amplifier of claim 1 further including an output amplification section that amplifies the combined output signal prior to output.

3. The wide band optical amplifier of claim 2 wherein the split section includes an S-band amplification branch, the S-band ranging from 1510 nm to 1525 nm.

4. The wide band optical amplifier of claim 2 wherein the split section includes an M-band amplification branch, the M-band ranging from 1525 nm to 1565 nm.

5. The wide band optical amplifier of claim 2 wherein the split section includes an L-band amplification branch, the L-band ranging from 1565 nm to 1610 nm.

6. A method of amplifying optical signals, the method comprising the steps of:

splitting the optical signals into a plurality of sub-band signals;

further splitting, one or more of the sub-band signals into further sub-band signals;

amplifying, at least two of the sub-band signals; and combining, the sub-band and further sub-band signals into an output signal.

7. The method of claim 6 further comprising the step of: amplifying the combined output signal.

8. The method of claim 7 further comprising the step of: amplifying the optical signals prior to splitting.

9. The method of claim 7 in which the plurality of sub-bands includes an S-band, the S-band ranging substantially from 1510 nm to 1525 nm.

10. The method of claim 7 in which the plurality of sub-bands includes an M-band, the M-band ranging substantially from 1525 nm to 156 nm.

11. The method of claim 7 in which the plurality of sub-bands includes an L-band, the L-band ranging substantially from 1565 nm to 1610 nm.

12. An article comprising a wide band optical amplifier having an input port and an output port, the article comprising:

an input section optically connected to the input port;

an optical splitter optically connected to the input section for splitting optical signals traversing the input section into a plurality of sub-bands;

a split section optically connected to the optical splitter, the split amplification section including a plurality of amplification branches wherein particular ones of the sub-bands traverse particular ones of the amplification branches in parallel; the split amplification section including:

a hybrid split amplification section in which at least one of the sub-bands that traverse the split amplification section is further split into a number of additional sub-bands, the hybrid split amplification section having a number of separate amplification branches such that all of the sub-bands may be amplified in parallel;

an optical combiner for combining the sub-bands and additional sub-bands into an output signal after they have traversed the split amplification section; and an output section in communication with the sub-band combining means and the output port.

13. The article of claim 12 wherein said output section further comprises:

a means for amplifying the combined output signal.

14. The article of claim 13 wherein said input section further comprises:

a means for amplifying the optical signals.

15. The article of claim 12 in which the plurality of sub-bands includes an S-band, the S-band ranging substantially from 1510 nm to 1525 nm.

16. The article of claim 12 in which the plurality of sub-bands includes an M-band, the M-band ranging substantially from 1525 nm to 1565 nm.

17. The article of claim 12 in which the plurality of sub-bands includes an L-band, the L-band ranging substantially from 1565 nm to 1610 nm.

* * * * *